3,454,438
GELLED NITRIC ACID BLASTING AGENT
Robert Alan Simpson, San Mateo, Calif., and George Abraham Cross, New Castle, and James Paul Rishel, Edinburg, Pa., assignors to American Cyanamid Company, Stamford, Conn., a corporation of Maine
No Drawing. Filed Dec. 29, 1967, Ser. No. 694,393
Int. Cl. C06b 1/04
U.S. Cl. 149—47                              7 Claims

ABSTRACT OF THE DISCLOSURE

Blasting compositions comprising nitric acid, a gelling agent and a nitric acid miscible, soluble or reactive organic fuel comprising a nitroparaffin. The compositions can contain additional materials such as oxidizers, density modifiers, or cross-linking agents.

---

This invention relates to gelled blasting compositions containing nitric acid and a nitric acid miscible of soluble nitroparaffinic compound. More particularly, it relates to the provision of a blasting composition in gelled form having as its essential components nitric acid, a nitric acid-miscible, soluble or reactive nitro-paraffinic compound, a gelling agent and water.

Blasting composition containing nitric acid have been known for many years. One type is the combination of nitric acid and a nitroaromatic compound. Such materials have the severe disadvantage of being in liquid form and corrosive in nature, and thus difficult to handle. Attempts to overcome this disadvantage have involved using glass containers with separate internal compartments for the nitric acid component and the aromatic nitro component. These attempts have been far from successful in that the packaging and handling problems involved with the use of glass containers filled with nitric acid are almost insurmountable, since explosives are used under rough field conditions.

It is an object of the present invention to provide a blasting composition based upon nitric acid, a nitric acid-miscible, soluble or reactive nitroparaffinic compound and a gelling agent. It is a further object of the present invention to provide such a blasting composition in the form of a water-containing gel which is of high blasting strength and physical stability under normal field conditions. Other objects will be apparent from the ensuing description of this invention.

In accordance with this invention, it has been discovered that nitric acid in combination with a nitric acid miscible, soluble or reactive nitroparaffinic compound and a gelling agent which is stable in the presence of nitric acid, provides a very useful blasting composition, which is capable of detonation under field conditions. The blasting compositions of the present invention may advantageously contain other materials which do not interfere with blasting capabilities, but do impart properties which may be desirable to most specific conditions of use. Thus, it may be desirable to add ammonium nitrate, a density modifying agent and a cross-linking agent to enhance the activity of the gelling agent.

The nitric acid which can be used herein is an aqueous solution of about 30 to 98% concentration. Nitric acid of about 50 to 90% concentration is very suitable for use in the present invention and such compositions, being readily available in commerce, are preferred. Nitric acid solutions of less than 50% concentration tend to become insensitive to normally employed detonation techniques.

The nitroparaffinic compounds which are useful in this invention are, as stated above, at least partially acid miscible, soluble or reactive. The degree of solubility or miscibility which is required is dependent on the proportions of the nitroparaffinic compound in the blasting composition. Solubility or miscibility should be sufficient to permit blending of the nitric acid and nitroparaffinic compound without a great deal of separation of these components into different phases. When the nitroparaffinic compound is a solid, it is important that it is sufficiently soluble to be dissolved in the aqueous nitric acid to the extent that it is present. When the nitroparaffinic compound is a liquid, it is important that it is acid-miscible to the extent of its presence in the composition since otherwise it will form a second liquid phase which might not gel and would create handling and packaging problems. A small amount of undissolved solid nitroaromatic fuel is tolerable within the framework of the present invention. However, it is desirable to minimize the quantity of undissolved fuel components.

The nitroparaffinic compounds useful in the present invention as the fuel material are nitric acid miscible or soluble materials which have at least one nitro group. Representative materials are nitromethane, nitroethane, dinitroethane, nitropropane, dinitropropane, nitrobutane, dinitrobutane, nitroisobutane, dinitroisobutane, and the like and mixtures thereof.

The blasting agents of this invention contain a gelling agent which is stable in the presence of aqueous nitric acid. The choice of a gelling agent is, in this sense, critical. Among the commercially available materials are water soluble copolymers of methyl vinyl ether and maleic anhydride, available under the tradename "Gantrez AN" resins; polyvinylpyrrolidones of various grades; polyacrylic acids and ammonium polyacrylates; copolymers of ethylene and maleic anhydride; copolymers of acrylamide and N,N'-methylene bisacrylamide; and polyacrylamide. Anhydrous silica is also useful as a gelling agent since it is acid resistant. Examples of commercially available anhydrous silica are those sold under the names "Cab-O-Sil" and "Santogel." The preferred gelling agent for use in the present invention is derived by the copolymerization of methyl vinyl ether and maleic anhydride.

Best advantage of the gelling agent is taken by the inclusion in the blasting agent of a cross-linking agent which functions with the particular gelling agent which is used. In many cases, these are metal salts, preferably chlorides or nitrates, but also acetates, hydroxides and sulfates of such metals as tin, chromium, lead, zirconium, iron, copper, zinc, nickel, manganese, cobalt, titanium and aluminum, may be used.

While the present invention provides a blasting composition which is independent of the use of ammonium nitrate, it may be desirable for specific uses to include ammonium nitrate in the blasting composition. When used, ammonium nitrate can be present either as finely ground material or in the form of prills. Ammonium nitrate used in the compositions of this invention can be obtained as fertilizer grade prills, pellets or granules. The material should be preferably a particle size such that it will pass through a No. 6 U.S.S. screen.

It is often advantageous to include a density modifying agent in the formulations of the present invention, especially when such formulations are prepared from nitric acid solutions of less than 80% by weight nitric acid. Such density modifying agents are acid resistant materials which contain entrapped air such as perlite, hollow glass spheres or vermiculite. Other useful materials are frothing agents of non-ionic surfactant type, for example, esters of sorbitan with fatty acids, e.g., sorbitan monopalmitate, sorbitan monostearate, and sorbitan monolaurate.

Blasting compositions of the present invention should contain from 3 to 90% by weight of nitric acid of at least 30% concentration. Additionally, they must have a minimum of about 1.0% by weight of the nitroparaffinic compound. In addition to these two materials, a gelling agent in a weight proportion of about 0.1 to about 10%, based on the weight of the entire composition, should be present. Though not entirely necessary, it is desirable to have up to about 5% by weight of a cross-linking agent to enhance the action of the gelling agent. Density modifying agents can be present in a concentration of up to about 10%. When ammonium nitrate is used as an auxiliary oxidizing agent, as much as 80% may be present in the explosive composition. The amount of such material which is used is optional and will depend on such factors as desired properties of the blasting agent and the relative availability of the materials.

It is preferred to use for each 100 parts of anhydrous nitric acid 70 to 170 parts of the nitric acid-miscible, soluble or reactive nitroparaffinic compound, 0 to 800 parts of ammonium nitrate, 1 to 20 parts of the acid-stable gelling agent, 0.1 to 10 parts of cross-linking agent and 1 to 100 parts of water.

The fuel and oxidizer components used in this invention preferably should be present in such quantities as to give an oxygen balanced composition. By "oxygen balance" is meant there is sufficient oxygen in the composition to oxidize the fuel components to their maximum state of oxidation, e.g., combined carbon to carbon dioxide.

The various components of the blasting composition of this invention can be blended in any convenient manner although it may be necessary to apply moderate heat during the blending steps or to adjust the order of addition of the various components to enable effective blending to take place. However, the manner of preparing the material is not a part of the present invention.

The following examples are presented to illustrate the present invention. In the examples, parts and percentages are on a weight basis unless otherwise noted. The designation "EBC" is used to denote electric blasting cap.

Example 1.—Blasting composition with nitromethane

| | Percent |
|---|---|
| Ammonium nitrate | 69.5 |
| Nitric acid (42° Bé.) | 14.0 |
| Nitromethane | 13.0 |
| Sorbitan monopalmitate | 1.5 |
| Gantrez AN-169 | 1.0 |
| Chromium nitrate (39% aqueous) | 1.0 |

| | |
|---|---|
| Density, g./cc. | 0.98 |
| Rate of detonation, m.p.s. | 3490 |
| Cap sensitivity | No. 6 EBC |

Example 2.—Blasting composition with nitropropane

| | Percent |
|---|---|
| Ammonium nitrate | 65.0 |
| Nitric acid (90% aqueous) | 18.0 |
| Nitropropane | 15.5 |
| Gantrez AN-169 | 1.0 |
| Chromium nitrate (39% aqueous) | 0.5 |

| | |
|---|---|
| Density, g./cc. | 1.54 |
| Rate of detonation, m.p.s. | 5190 |
| Cap sensitivity | No. 16 EBC |

Example 3.—Blasting composition with nitromethane

| | Percent |
|---|---|
| Nitromethane | 57.0 |
| Nitric acid (90% aqueous) | 40.0 |
| Cab-O-Sil M-5 | 3.0 |
| | 100.0 |

The composition had the following properties:

| | |
|---|---|
| Reaction | No |
| Rate of detonation, m.p.s., in 1¼" x 12" steel pipe | 6550 |
| Density, g./cc. | 1.25 |

Example 4.—Blasting composition with nitroethane

| | Percent |
|---|---|
| Nitroethane | 40.0 |
| Nitric acid (90% aqueous) | 55.0 |
| Cab-O-Sil M-5 | 5.0 |
| | 100.0 |

The blasting composition had the following properties:

| | |
|---|---|
| Reaction | No |
| Rate of detonation, m.p.s., in 1¼" x 12" steel pipe | 6950 |
| Density, g./cc. | 1.32 |

Example 5.—Blasting composition with nitroethane-dinitroethane

| | Percent |
|---|---|
| Nitroethane | 30 |
| Dinitroethane | 25 |
| Nitric acid (90% aqueous) | 40 |
| Cab-O-Sil M-5 | 5 |
| | 100 |

The blasting composition had the following properties:

| | |
|---|---|
| Reaction | No |
| Rate of detonation, m.p.s., in 1¼" x 12" steel pipe | 7260 |
| Density, g./cc. | 1.35 |

We claim:
1. A stable blasting composition of high blasting strength consisting essentially of:
   (a) 3 to 90 weight percent of nitric acid of about 30 to 90% concentration;
   (b) at least 1 percent by weight of a nitric acid-miscible or soluble nitroparaffinic compound; and
   (c) at least 0.1 weight percent of a gelling agent.
2. The composition of claim 1 having up to 80 weight percent of ammonium nitrate.
3. The composition of claim 1 having at least 0.01 weight percent of a cross-linking agent to enhance the activity of the gelling agent.
4. The composition of claim 1 containing, for each 100 parts of anhydrous nitric acid, 70 to 170 parts of nitroparaffinic compound; up to 800 parts of ammonium nitrate; 1 to 20 parts of acid-stable gelling agent; 0.1 to 10 parts of cross-linking agent; and 1 to 100 parts of water.
5. The composition of claim 4 wherein the gelling agent is an anhydrous form of silica.
6. The composition of claim 4 wherein the gelling agent is a copolymer of methyl vinyl ether and maleic anhydride.
7. The composition of claim 6 having an effective amount of chromium nitrate as a cross-linking agent.

References Cited

UNITED STATES PATENTS

| | | | |
|---|---|---|---|
| 2,325,065 | 7/1943 | Lawrence | 149—74 |
| 2,355,817 | 8/1944 | Morrow | 149—74 |
| 3,116,187 | 12/1963 | Scanlon et al. | 149—90 X |
| 3,216,872 | 11/1965 | Wells | 149—57 X |
| 3,242,019 | 3/1966 | Gehrig | 149—74 X |
| 3,296,044 | 1/1967 | Gehrig | 149—74 X |
| 3,306,789 | 2/1967 | Logan et al. | 149—74 X |
| 3,361,601 | 1/1968 | Chrisp | 149—74 X |

CARL D. QUARFORTH, Primary Examiner.

MELVIN J. SCOLNICK, Assistant Examiner.

U.S. Cl. X.R.

149—18, 74, 89